US008340584B2

(12) United States Patent
Lakshmanan et al.

(10) Patent No.: US 8,340,584 B2
(45) Date of Patent: Dec. 25, 2012

(54) SYSTEMS AND METHODS FOR ADAPTIVE BEAMFORMING IN INDOOR WIRELESS NETWORKS

(75) Inventors: Sriram Lakshmanan, Atlanta, NJ (US); Karthikeyan Sundaresan, Howell, NJ (US); Ravindranath Kokku, Monmouth Junction, NJ (US); Mohammad Ali Khojastepour, North Brunswick, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 792 days.

(21) Appl. No.: 12/368,246

(22) Filed: Feb. 9, 2009

(65) Prior Publication Data

US 2010/0056059 A1  Mar. 4, 2010

Related U.S. Application Data

(60) Provisional application No. 61/092,444, filed on Aug. 28, 2008.

(51) Int. Cl.
*H04B 1/00* (2006.01)
(52) U.S. Cl. ..................................................... 455/63.4
(58) Field of Classification Search .................. None
See application file for complete search history.

(56) References Cited

U.S. PATENT DOCUMENTS

| | | | |
|---|---|---|---|
| 6,754,473 B1 * | 6/2004 | Choi et al. | 455/101 |
| 7,929,918 B2 * | 4/2011 | Niu et al. | 455/69 |
| 2007/0126630 A1 | 6/2007 | Coppi | |
| 2008/0123579 A1 | 5/2008 | Kozat et al. | |
| 2008/0137581 A1 | 6/2008 | Doppler et al. | |
| 2008/0181318 A1 | 7/2008 | Kim et al. | |
| 2008/0204319 A1 | 8/2008 | Niu et al. | |
| 2008/0214182 A1 | 9/2008 | Wang | |
| 2008/0219373 A1 | 9/2008 | Zhang et al. | |
| 2008/0274692 A1 | 11/2008 | Larrson | |
| 2008/0316143 A1 | 12/2008 | Chen et al. | |
| 2009/0080366 A1 | 3/2009 | Shao et al. | |
| 2009/0109093 A1 | 4/2009 | Sun et al. | |
| 2009/0190536 A1 | 7/2009 | Zhang et al. | |
| 2009/0213779 A1 | 8/2009 | Zhang et al. | |

\* cited by examiner

*Primary Examiner* — Lincoln Donovan
*Assistant Examiner* — Sibin Chen
(74) *Attorney, Agent, or Firm* — Bao Tran; Joseph Kolodka

(57) ABSTRACT

Systems and methods are disclosed for transmitting signals between a transmitter and a receiver by differentially estimating channel coefficients for each of the antenna elements relative to a reference antenna element; determining beam weights to remove oscillator induced phase or offset; and applying a correction (beamforming solution) at the transmitter to make the phase of the received signal from different antenna elements to be coherently combined at the receiver.

13 Claims, 5 Drawing Sheets

```
┌─────────────────────────────────────────┐
│ Excite the reference element and measure │
│ the received symbols at each user 'i' as Ri1 │
│                 (150)                    │
└─────────────────────────────────────────┘
                    │
                    ▼
┌─────────────────────────────────────────┐
│       Estimate frequency offset as       │
│          δF= Δ(arg(Ri1))                 │
│       Correct received samples to form   │
│     Xi1= Ri1*e^(j*2* π* δF*n)   (152)    │
└─────────────────────────────────────────┘
                    │
                    ▼
┌─────────────────────────────────────────┐
│       Z1 = average(abs(X11(1:N)))        │
│              For i=2 to U                │
│         Zi = average(abs(Xi1(1:N)))      │
│   Zt= average(abs(X11(1:N)+Xi1(1:N)))    │
│ Δi = Cos⁻¹( (Zt²- Z1²- Zi²)/(2*Z1*Zi))  (154) │
└─────────────────────────────────────────┘
                    │
                    ▼
┌─────────────────────────────────────────┐
│      compute inter-user phase choices    │
│       as  Ωi = average(Δi) and           │
│              σi=Median(Δi)               │
│    Magnitudes Ni = |Zi|²/(∑ |Zi|²)  (156) │
└─────────────────────────────────────────┘
```

FIG. 5

SYSTEMS AND METHODS FOR ADAPTIVE BEAMFORMING IN INDOOR WIRELESS NETWORKS

This application claims priority to Provisional application Ser. No. 61/092,444, filed Aug. 28, 2008, the content of which is incorporated by reference.

BACKGROUND

Smart antennas form an integral component in realizing the high spectral efficiency requirements of next generation wireless standards. Adaptive beamforming is a popular strategy that helps leverage the smart antenna benefits in environments rich in multipath scattering. Smart antennas consist of an array of omni-directional elements, with the bulk of sophistication residing in signal processing. Smart antennas represent a sophisticated physical layer technology that is capable of providing higher spectral efficiencies. Leveraging smart antenna gains can be accomplished through several strategies namely, spatial multiplexing, space-time codes and beamforming. While the former two are primarily associated with MIMO (multiple-input multiple-output), wherein both ends of the link possess smart antennas, beamforming is possible even if only one end of the link is smart antenna enabled. Beamforming employs multiple antenna elements to focus the radiated signal energy in specific directions towards the receiver, thereby increasing its SINR. Beamforming can vary from simple switched type to fully adaptive type. While switched beamforming is normally implemented as an open-loop solution and provides benefits in line of sight environments, an adaptive beamforming system implemented as a closed-loop solution (where channel feedback is required from the receivers) is required to effectively counteract multipath, which is prevalent indoors. Realization of the (theoretical) benefits of adaptive beamforming has led to its adoption in several next-generation wireless standards oriented both outdoors such as LTE and WiMAX, and recent indoor WPAN standards such as WirelessHD and NGmS which utilize the 60 Ghz spectrum.

Adaptive beamforming involves three main steps. The first step is channel sounding where the transmitter (Tx) sends a pilot packet on the channel. The second step is channel estimation and feedback where the receiver (Rx) estimates the channel gain and feeds this information back to the transmitter. The third step is beam computation where the transmitter adapts the beam pattern based on the channel feedback from the receiver. The performance of adaptive beamforming is closely tied to the accuracy of estimating the complex channel coefficients (which characterize the channel gain) between the Tx and Rx. Inaccurate estimates could potentially degrade performance to worse than an omni system. An oscillator drift between the Tx and Rx introduces a phase and frequency offset, thereby corrupting the channel phase component of the estimated samples. In addition, variation of the oscillator-induced phase offset with time makes it harder to isolate the channel phase component.

In the case of beamforming antennas, the signals that are transmitted to each of these antenna elements can be weighted in both amplitude and phase to produce a desired beam pattern that increases the SNR at the receiver, resulting in an array gain. The capacity of a beamformed link between a K element beamforming Tx and an omni Rx is given by, $$C = \log(1 + K\rho) \quad (1)$$

where the array gain is $K\rho$, $\rho$ being the received SNR due to an omni Tx. This represents the asymptotic capacity gain achievable in free space environments. However, indoor wireless channels are impaired by random fluctuations in signal level along the space and time dimensions referred to as fading due to which the above array gain is not achievable in practice. To mitigate the effect of fading, multiple transmit elements together with appropriate signal processing can be used to enhance and stabilize the signal level at the receiver. The multiple and ideally independent observations of the signal ensure that the link reliability or error rate performance at the receiver is improved since the probability of all of them being in a fade at the same time reduces sharply with the number of observations. This gain in SNR for a required probability of error is called the diversity gain.

The weights used to modify the amplitude and phase of the signals at the Tx antenna array can be written as $$w = [w_1 w_2 \ldots w_K] \quad (2)$$

When a transmitter with multiple elements communicates with a receiver which has an omni-directional antenna, the wireless channel so formed is called a Multiple Input Single Output (MISO) channel. The baseband channel model for a MISO channel with beamforming is given by $$y = h^T x + z \quad (3)$$

where the column vector $h = [h_1 \ h_2 \ldots h_K]^T$ denotes the channel, x is the K×1 vector of the transmitted signals, y is the received signal and z is the additive White Gaussian noise. A beamformer is defined as a weight vector w which translates each transmit symbol s to the signal vector x=ws to be transmitted from the K antennas.

Beamforming is a technique, where the weights w are adapted to get a desired beam pattern, so that the SNR at the receiver is maximized. Depending on the level of sophistication in adapting weights, there are two main types of beamforming namely, switched and adaptive. In the case of switched beamforming, a set of pre-determined beam patterns covering the entire azimuth of 360 degrees are made available. Each of these beam patterns has a main lobe of maximum gain and some side lobes representing leakage of energy. The patterns are generated by selecting weights that vary the phase across the antenna elements, while keeping the amplitude the same; the latter is achieved by splitting the transmit power equally across all the elements. As switched beamforming is normally implemented as an open-loop procedure without channel feedback from the Rx, a Tx will tend to choose a pattern that is in the physical direction of the Rx expecting that beam to yield the strongest signal strength at the Rx. In the presence of multipath, a beam pointing in the physical direction of the Rx may no longer yield the strongest signal at the Rx and almost never will in a NLOS (non-line of sight) environment.

In adaptive beamforming, real-time channel feedback from the client is employed to adapt the beam pattern at the Tx. Beams are no longer selected to point in the direction of the Rx, but instead is adapted in the signal domain to maximize the resulting SINR at the client. The resulting beam pattern may not have the single main lobe structure of a switched beam as shown in FIG. 1 but is optimized to reinforce the multipath components of the signals arriving from the different Tx antenna elements, at the Rx. While the need for channel estimation and feedback makes its implementation complex, it has the potential to counteract multipath effects, which are dominant indoors. Given a channel gain vector h, the transmit array's weights are determined to be its complex conjugate, so that the phase difference between the signal components arriving at the Rx transmitted through the different antenna elements are corrected, yielding high SINR due to coherent combining at the Rx. With reference to equation 3, this is achieved by choosing $$w_i = \frac{h_i *}{\sqrt{\sum_{i=1}^{K} |h_i|^2}}$$

given the channel $[h_1\ h_2\ \ldots\ h_K]$ to a single receiver. An illustration of such an adaptive pattern is shown in FIG. 1. This is a pattern that was seen to be the optimal beam pattern in an indoor (multipath-rich) office environment and was obtained using actual experiments. It is clear that the adaptive pattern is significantly different from the corresponding switched beam pattern (resulting in a 5 dB improvement in SNR at the receiver in this case).

As pointed out in Equation 1, increasing the beamforming elements (referred to as degrees of freedom—dof) at the AP will only increase the array gain linearly, contributing only to a logarithmic increase in the data rate at the client, assuming SU beamforming is used. However, by accommodating and jointly beamforming to multiple clients, the dof can be more efficiently utilized resulting in a much better scaling of capacity with MU beamforming. Further, in MU beamforming, the AP can produce beam patterns which improve the signal strength at the clients to which it is beaming data and at the same time suppress interference to the clients that are communicating with other APs.

SUMMARY

Systems and methods are disclosed for transmitting signals between a transmitter and a receiver by differentially estimating channel coefficients for each of the antenna elements relative to a reference antenna element; determining beam weights to remove oscillator induced phase or offset; and applying a correction (beamforming solution) at the transmitter to make the phase of the received signal from different antenna elements to be coherently combined at the receiver.

Advantages of the system may include one or more of the following. The differential channel estimation process employs intelligent excitation patterns on the antenna elements (as part of the channel sounding procedure) to isolate the differential channel phase within a pair of antenna elements, without having to estimate the phase offset. Isolating channel phase is harder for the multi-user case, where the differential channel estimation is supplemented with intelligent sampling and combining. For the beam computation, the system identifies patterns that are simple to compute and are intuitive in addressing the performance characteristics focused on. The system achieves superior beamforming performance as measured both in terms of its ability to improve Tx-Rx link SINR and also in its efficiency in terms of interference suppression, i.e. minimize interference at other Tx-Rx links that use the same channel.

The system provides a higher quality solution for adaptive beamforming in indoor wireless networks, which is a key technology in several future WLAN and WPAN standards and applications. The system addresses the oscillator induced offset problem to realize efficient beamforming while keeping the system complexity and cost low. Using simple beam computation strategies, adaptive beamforming is achieved for both single-user (SU) and multi-user (MU) scenarios to the benefits of adaptive beamforming in indoor wireless networks. Cost is reduced due to the ability to use less expensive processing power as well as cheap oscillators since the channel gains between transmitters and receivers can be determined without having to isolate and individually estimate the oscillator and channel phase offsets.

BRIEF DESCRIPTION OF THE DRAWINGS

FIG. 5 shows an exemplary process to perform multi-user differential channel estimation.

DESCRIPTION

Figure 1:
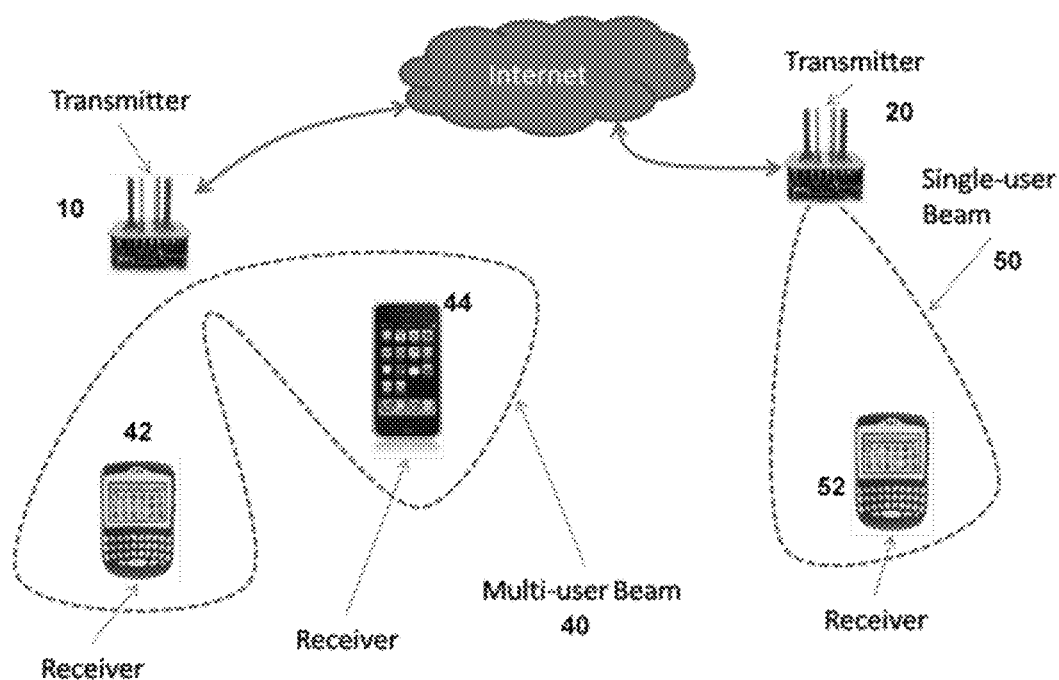
FIG. 1 shows an exemplary in-door wireless network with smart antennas.

FIG. 1 shows an exemplary in-door wireless network with smart antennas. For this environment, the estimation problem with arrays conventionally requires fast switching of antenna elements within the preamble of a packet at the transmitter. Similarly, a sophisticated receiver capable of estimating the channel reliably and using it immediately is typically required.

The system of FIG. 1 includes transmitters 10 and 20 that communicate over the Internet 30. The transmitters 10 and 20 can communicate with a single user or a plurality of users. For example, the transmitter 10 communicates with receivers 42 and 44 over a multi-user beam 40. Alternatively, the transmitter 20 communicates with a receiver 52 over a single user beam 50.

Figure 2:
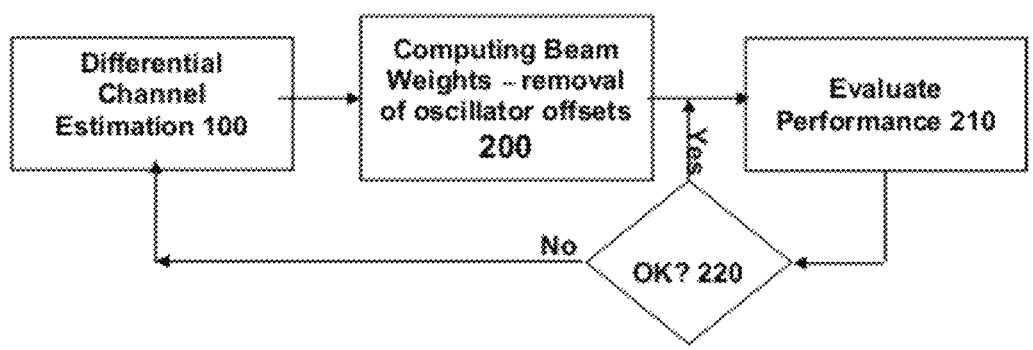
FIG. 2 shows an exemplary beam forming process in accordance with the present invention.

The transmitters 10 and 20 use an adaptive beamforming process shown in FIG. 2. The system of FIG. 2 supports effective beamforming in the presence of oscillator phase and frequency offset for single users as well as multiple users. The system is particularly effective in indoor beamforming where the channel varies frequently. The system avoids the need to constantly collect samples to perform reliable channel estimation.

Adaptive beamforming is a closed-loop procedure where feedback about the channel is required from the receivers. To provide this feedback, receivers need to perform channel estimation. The aim of the channel estimation process is to obtain accurate estimates of the complex numbers $h_{ij}$ that represent the channel gain between the multiple elements (i) at the transmitter and multiple receivers (j). In general, the phase of the received sample varies varies across time due to the random fading nature of the channel. However, even when the channel remains relatively static, the phase of the received symbols is corrupted by the phase and frequency offsets induced by the oscillator. More specifically, the phase of the $m^{th}$ received samples is given as, $$\arg(y_{1j}(m)) = \phi_{1j} + \theta_1 + 2\pi\delta f m + \beta(m) \qquad (4)$$

where the phase of the received sample consists of four components, $\phi_{1j}$—the channel phase, $\theta_1$—the oscillator induced phase offset, $\delta f$—the oscillator induced frequency offset and $\beta(n)$—the data dependent phase for a given modulation and symbol n. The system extracts the channel phase $\phi_{1j}$ the estimate of which is corrupted by additional components using measurements based on packet level transmissions only. Additionally, measuring each antenna element gain $h_{ij}$ requires a new excitation. Hence, the oscillator offsets also vary across the excitations of different elements making it impossible to measure the absolute phases of $h_{ij}$.

In differential phase estimation, the phase of the channel coefficients is measured differentially with respect to a single reference element. This approach is based on the following properties of differential channel phase in indoor MISO channels.

Property 1. Differential phases are sufficient to achieve optimal beamforming benefits Property 2. Differential phases are dependent only on the spatial channel (of each antenna element) whereas the oscillator induced offsets vary with time and hardware but are independent of the spatial location of the transmitting elements.

Property 3. Differential phases vary predominantly with spatial channel (of each antenna element) and are relatively immune to short term temporal variations as far as beamforming is considered.

FIG. 2 shows an exemplary beam forming process in accordance with the present invention. The process performs differential channel estimation in block 100. The differential estimation block 100 estimates channel coefficients for each of the antenna elements relative to that of a reference antenna element and a correction (beamforming solution) is directly applied to make the phase of the received signal from different antenna elements coherently combined at the receiver. The process determines the beam weights in block 200. This operation ensures that the transmissions from the antenna elements combine constructively at the receiver. The beamforming methods can be used for both single user and multi-user cases. In block 210, the system performance is evaluated. In block 212, if satisfactory, then the process loops back to block 210 to ensure performance and if unsatisfactory, the process performs the differential channel estimation of block 100 again.

Figure 3:
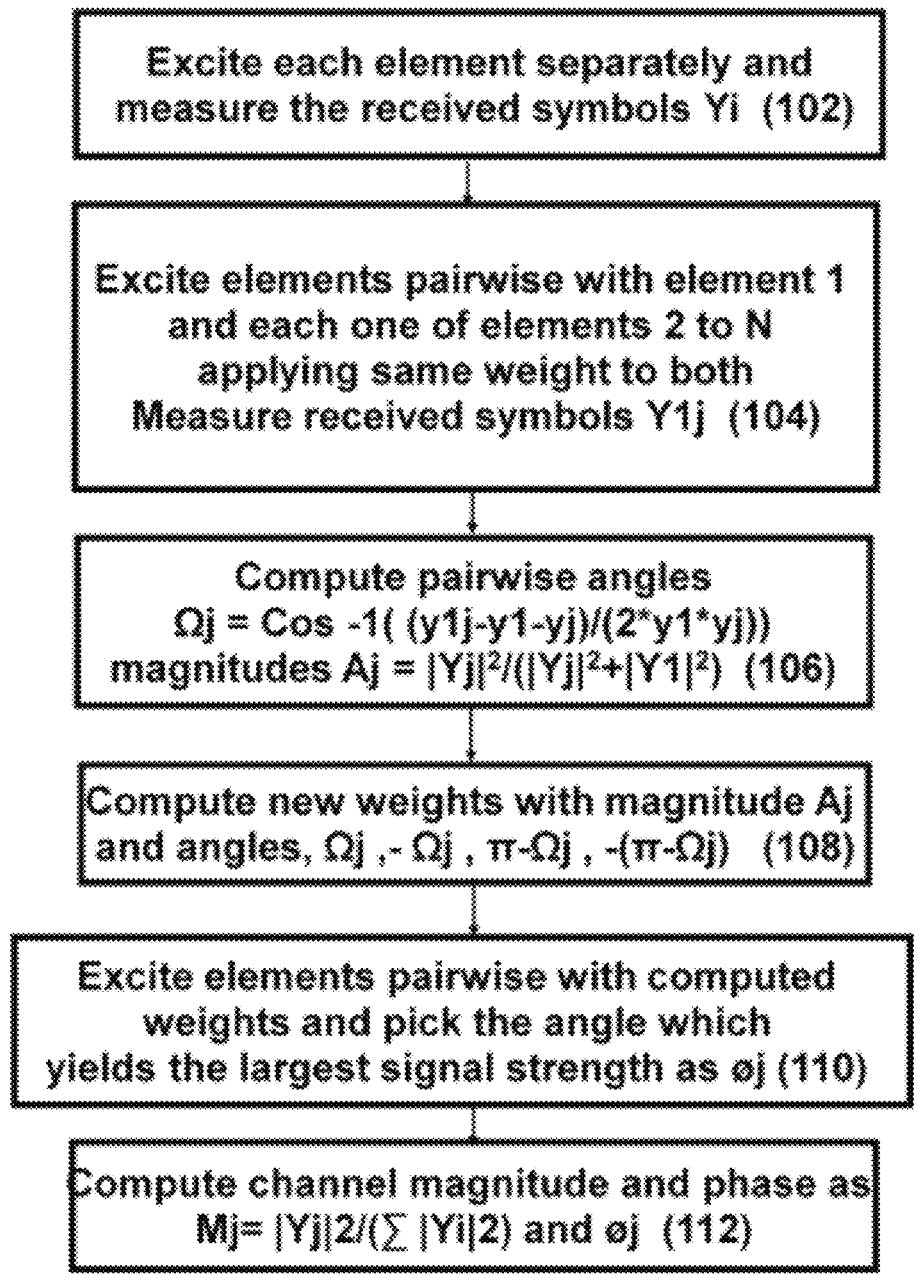
FIG. 3 shows an exemplary process to perform single user differential channel estimation.
Figure 4:
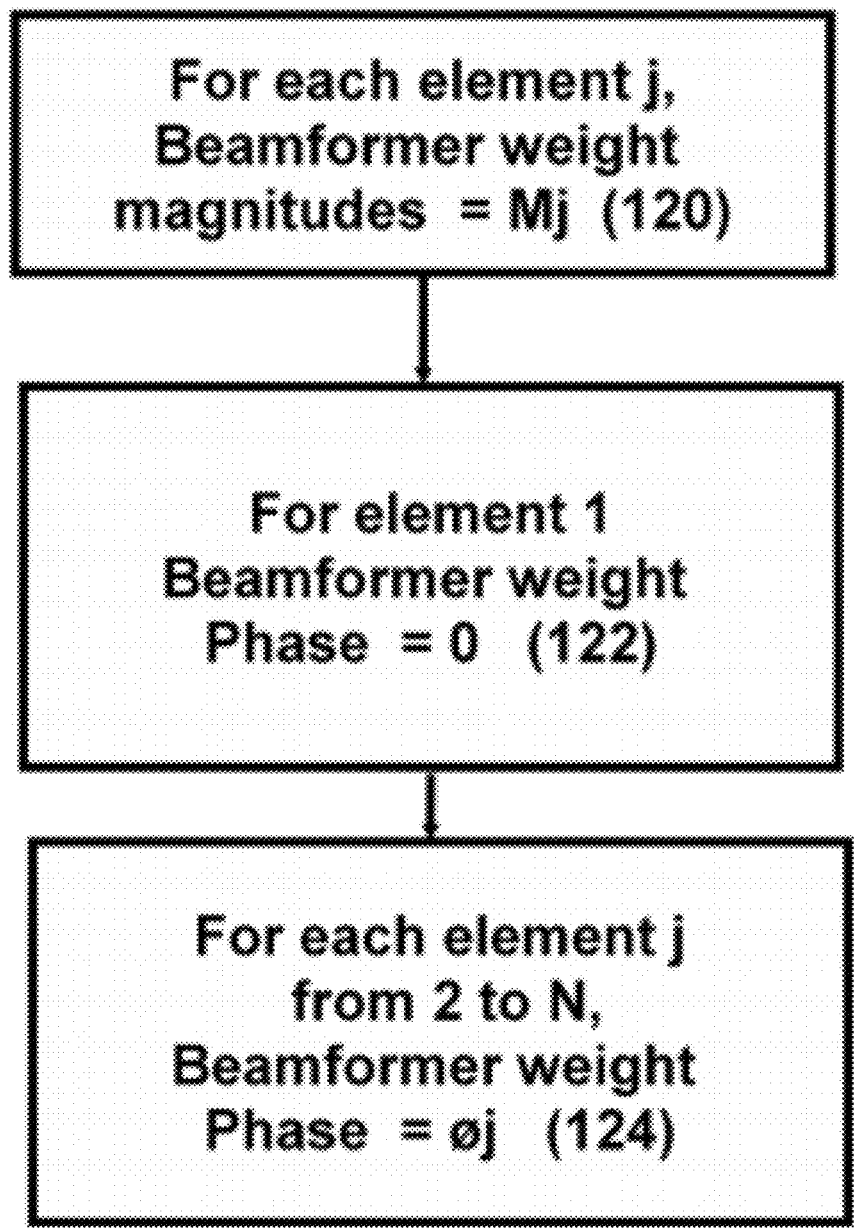
FIG. 4 shows an exemplary process to perform single user beamforming weight determination.

Turning now to FIG. 3 and FIG. 4, processes for single user beamforming are shown. FIG. 3 shows an exemplary process to perform single user differential channel estimation, while FIG. 4 shows an exemplary process to perform single user beamforming weight determination.

In the following discussion, the following notations are used:

$y_i$ is the average received signal amplitude (at the receiver) when element i alone is used at the transmitter. Similarly $y_{jk}$ is the received amplitude when both elements j and k are excited simultaneously at the transmitter at the same phase.

$\Omega_i$—measured angle for ith (i>0) element.

$\varnothing_i$—Correct phase applied to ith element.

$A_i$—amplitude applied to ith element

Referring to FIG. 3, a single user channel estimation process is shown. First, the process excites each element separately and measure the received symbols (102). Next, the process excites elements pairwise with element 1 and each one of elements 2 to N, applying same weight to both, and then measures the received symbols (104). The process then computes pairwise angles and magnitudes (106). Next, it computes new weights with magnitude and angles (108). The process excites elements pair-wise with computed weights and pick the angle which yields the largest signal strength (110). The process then computes channel magnitude and phase (112).

In one implementation, the differential channel estimation process 100 includes a coarse estimation operation. In this operation, each element from 2 to K is along with a reference element. For each pair of elements, $y_1, y_2, y_3$ are measured using excitation (1,0) (0,1) and (1,1). The signal magnitudes across all symbols in a packet are averaged and the mean of these per-packet estimates are identified as $y_1, y_2$ and $y_{12}$. The process determines $$\Omega_i = \cos^{-1}((y_{12}^2 - y_1^2 - y_2^2)/(2 * y_1 * y_2))$$

Next, the process 100 performs ambiguity resolution. In this operation, the elements are excited in the pairs identified before using the calculated $\Omega_i$ and its signed compliment ($\Omega_i$, $-\Omega_i, \pi-\Omega_i, -(\pi-\Omega_i)$). From these four angles, the angle which yields the maximum Signal Strength at the receiver is identified as $\varnothing_i$. For angles with similar signal strength, the one which has higher packet delivery is used.

In one embodiment for Single-user Channel Estimation, the process to estimate the magnitude of the channel gain and differential phase for a single user j is composed of the following operations.

1—Single Element Excitation: First, the magnitude of the channel gains to the receiver is obtained by exciting each of the K elements, one element at a time by setting $w_i$ for element i in Equation 2 to a positive constant $c_1$ (that depends on the transmit power) and setting all other weights to zero. Using the channel model described in equation 3, the mean of the magnitude of the received samples is, $$\text{MEAN}(|y_{ij}|) = c_1 \cdot |h_{ij}| \qquad (5)$$

2—Joint Excitation: In this step, elements are excited jointly to leverage Observation 2. Although one can excite any number of elements simultaneously, it is important to recall that the channel estimation overhead increases linearly with the number of excitations, which we want to keep to a minimum. Hence, the elements are excited two at a time while fixing a single element as a reference element (element 1). Thus, element 1 and element i, i∈[2, K] are excited with equal phase and magnitude. Now, $w_i$s in equation 2 are set to be a positive constant $c_2$ for element 1 and element i, and zero for others where $$c_2 = \frac{c_1}{\sqrt{2}}.$$

Using Equation 3, under reasonable operational SNRs, the received samples $d_{ij}$ can be written as, $$d_{ij}(n) = (c_2 \cdot h_{1j} + c_2 \cdot h_{ij}) e^{-j(2\pi \delta f_i n + \theta_i)} \qquad (6)$$

where $\delta f_i$ is the frequency offset and $\theta_i$ is the phase offset for the measurement when element i is excited. Clearly, the measured sample for each coefficient $d_{ij}(n)$ is corrupted by a different offset value $(\delta f_i, \theta_i)$.

3—Differential phase computation: In this step, the measured samples in steps 1 and 2 are processed to determine the differential phases. The magnitude of the $n^{th}$ sample of $d_{ij}$ is given by, $$|d_{ij}(n)| = \frac{c_1}{\sqrt{2}} \sqrt{|h_{1j}|^2 + |h_{ij}|^2 + 2|h_{1j}||h_{ij}|\cos(\Phi_{ij} - \Phi_{1j})} \qquad (7)$$

Since the measured values can vary around its mean, we average the values over multiple symbols in a packet to obtain a=MEAN($|y_{1j}|$), b=MEAN($|y_{ij}|$) and c=MEAN($|d_{ij}|$). Allowing $\omega = \phi_{ij} - \phi_{1j}$ and simplifying yields $$\omega = \cos^{-1}\frac{2c^2 - a^2 - b^2}{2ab} \quad (8)$$

With joint excitation of two elements, there is a single phase offset and a frequency offset as opposed to two phase offsets and frequency offsets when elements are excited one at a time. This is due to the fact that the offsets induced by the oscillator vary with time but not with space, unlike the channel which also varies with space. Leveraging this property enables the decoupling of the channel phase and oscillator phase. Optimizations of the basic joint excitation technique are contemplated by the present inventors. The use of the magnitude of received samples $|y_{ij}|$ and the $\cos^{-1}$ function introduces a 4-way ambiguity $(\omega, -\omega, \pi-\omega, -(\pi-\omega))$ which is resolved by joint excitation with each of the angles and identifying the angle yielding the highest SNR.

Turning now to FIG. 4, an exemplary beamforming process for a single user is shown. For the single user beamforming case, the aim of beamforming is to maximize the SNR at the receiver. This is equivalent to maximizing $\|h_1^T w\|^2$ subject to $\|w\|^2=1$ (Equation 3). Thus, the optimal beamformer is given by $w=h^*_1$.

The process of FIG. 4 performs weight determination in block 200 of FIG. 2. In this process, the amplitudes are set as as $A_i=(y_i^2/\Sigma y_i^2)$. First, for each element j, the beamformer weight magnitude is set (120). For element 1, the beamformer weight phase is set to zero (122). Next, for each element j, the negative of the computed channel phase $-\varnothing_i$ is applied to each element i (124).

The process of FIG. 4 strikes a good balance in the performance-complexity tradeoff for beamforming. One key factor that echoes in all the indoor channel measurements is the large channel variation across antenna elements. Hence, a good balanced strategy should try to exploit this variation well, while incurring a low complexity. Such a strategy is antenna selection. In antenna selection, each of the individual antenna elements are excited with full power and the RSSI estimated at the receiver. Using this RSSI feedback, the element delivering the highest RSSI is chosen for data transmission.

The RSSI for antenna selection depends on the square of the strongest channel coefficient, namely $\max_i\{h_i^2\}$. From RSSI expressions for switched and selection, the larger the variation in channel coefficients across elements, the larger is the gain of selection over switched. However, the more correlated the channel coefficients are, the larger is the gain of switched over selection, with the largest being a factor of N when the channel coefficients are all equal. Similarly the largest gain of adaptive over selection is attained when the channel coefficients are equal (when adaptive=switched), with the gains diminishing as the variation in coefficients increases. However, $RSSI_{adap} \geq RSSI_{sel}$. The antenna selection approach does not require channel estimation and beam weight computation and is much simpler than adaptive to implement, thereby serving as a potential candidate strategy for indoor environments.

In one test implementation of the channel estimation and beam computation procedures, a WLAN beamforming system includes an eight-element phased array smart antenna transmitter (AP) and several receivers (clients) with omni-directional antennas in an indoor office environment. Extensive measurements characterize the practical benefits of single-user (SU) adaptive beamforming over switched beamforming. The key findings based on extensive measurements are as follows.

Adaptive beamforming provides 12 dB gain over omni and 6-8 dB gain over switched beamforming for 80% of indoor locations, while antenna selection provides a 2-3 dB gain over switched beamforming.

Adaptive beamforming and antenna selection yield better scalability with antenna elements than switched beamforming. However, the saturation of gains with increasing antenna elements is more graceful for adaptive and switched beamforming than for antenna selection.

MU beamforming is essential to efficiently utilize the available antenna elements at the AP, especially when there are a large number of antenna elements. Three clients were successfully supported by MU beamforming as compared to one in SU beamforming with eight elements.

The larger the number of antenna elements, the better is the signal isolation (and interference suppression) between the desired channel and other channels with which the beam interferes, yielding differences in signal strengths of 12 dB and 22 dB for three and eight elements respectively.

Figure 6:
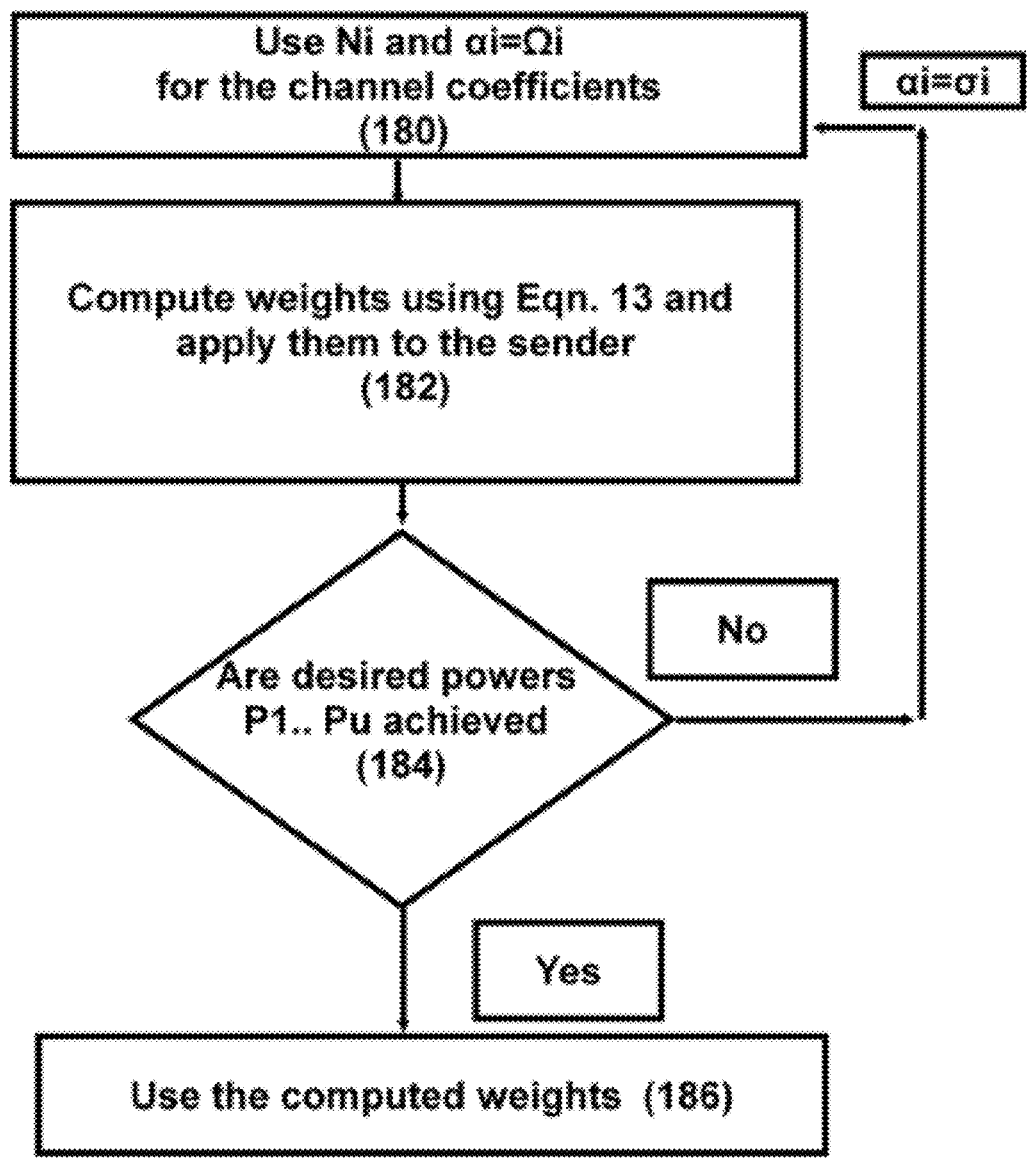
FIG. 6 shows an exemplary process to perform multi-user beamforming weight determination.

FIG. 5 shows an exemplary process to perform multi-user differential channel estimation, while FIG. 6 shows an exemplary process to perform multi-user beamforming weight determination. For the discussions of FIGS. 5-6, the following are the notations used:

$\Delta_j$: Phase difference between the channel gain (measured from a reference transmit element) between user 1 and user j.

R1: Complex received baseband samples of a packet
F1: Frequency offset correction exponential
S1: R1 with data modulation removed
X1: Frequency corrected and data removed received samples
N: Number of symbols in a packet
U: Number of users Turning now to FIG. 5, the channel estimation process 100 (FIG. 3) for single-user beamforming is used first. Following these steps, additional steps are used. In block 150, one antenna element at the transmitter (e.g element 0) is fixed for excitation and the received samples for at least tens of packets at the two receivers of interest are stored. Next, for each packet, the N received complex samples re represented as R1(1:N) and R2(1:N). The data modulation induced phase is removed either using known training symbols or using the data demodulation. The frequency offset is identified by differentiating the phase of the received samples in block 152. A new vector F1(1:N) is constructed as a complex exponential with the negative of this frequency offset. Then R1(1:N) is multiplied by the corresponding data values to get S1(1:N). Now the frequency corrected samples X1(1:N) are obtained by multiplying F1(1:N) and S1(1:N). Similarly X2(1:N) is found. Then, block 154 computes $Z_1$=average(abs(X1(1:N))), $Z_2$=average(abs(X2(1:N))), and $Z_3$=average(abs(X1(1:N)+X2(1:N))) and block 507 determines the offset angle between receivers as $$\Delta_i = \cos^{-1}((Z_3^2 - Z_1^2 - Z_2^2)/(2*Z_1*Z_2))$$

In block 156, the process determines inter-user phase choices and magnitudes. This procedure is repeated for each of the users from 2 to U, where U is the number of users.

Turning now to FIG. 6, a beamforming weight determination process for multi-users is shown. First, the process use Ni and $\alpha i=\Omega i$ for the channel coefficients (180). Next, the process computes weights using Eqn. 13 and apply them to the sender signal (182). The process checks if the desired powers P1 . . . Pu have been achieved (184) and if so, uses the computed weights (186). If not, the process loops back to 180 to continue determining the multi-user weight.

In one embodiment, a MISO baseband channel model for the $j^{th}$ user is considered as $y_j = h_j^T x + z_j$ where the column vector $h_i = [h_{1j} h_{2j} \ldots h_{M-j}]^T$ denotes the channel, x is the M by 1 vector of the transmitted signals, $y_j$ is the received signal and $z_j$ is the additive Gaussian noise. A beamformer is defined as a weight vector w which translates each transmit symbol s to the signal vector x=w s to be transmitted from the M antennas. The beamformer considered does not change the transmit power of the symbol s, i.e., $\|w\|^2 = 1$.

The multi-element array at the transmitter can be used to transmit multiple streams of data to different users. We consider single (common) stream transmission. In this case, beamforming can be used to achieve a desired distribution of power amongst users. In particular, a subset of K users for which the beamforming vector 'w' is to be optimized is selected such that the SINRs at the receivers of the user 1 to K follow a given distribution $P_1:P_2:\ldots:P_K$, respectively. In this embodiment, a zero share or proportion $P_j=0$ denotes a nulling of the signal at the corresponding receiver j. This objective is also closely connected to maximizing the minimum of the rate of users when the proportion $1:1:\ldots:1$ is considered.

In single-user estimation, the channel gain coefficients across the transmit elements to each receiver j is measured w.r.t the first element, i.e. $h_{1j}$. Thus, the reference angle for each user, i.e. the phase of $h_{11}$ for user 1, phase of $h_{12}$ for user 2, etc., is different. To perform multi-user beamforming, the phases must be known relative to a single reference such as $h_{11}$. Additionally, each receiver has a different phase and frequency offset. To address this, the system processes the samples of multiple users jointly to produce an estimate of the phase difference in the channel gains at the different receivers.

The procedure for a single user is first repeated individually for each user of interest. In addition, in one embodiment, the following operations are executed:

1—Excitation and Data phase removal: First, the reference element (element 1) is excited and the vector of received baseband samples at each user j is measured as $y_{1j}$. Recalling Equation 4, the phase of the received sample consists of four components, $\phi_{1j}$—the channel phase, $\theta_1$—the oscillator phase, $\delta f$—the oscillator frequency offset and $\beta(n)$—the data dependent phase for a given modulation and symbol n. The mean of the magnitude of the symbols received at each receiver is measured as $v_j$. First, the data phase is removed using the known data pattern of the training symbols and the resulting samples are denoted as $s_{ij}$.

2—Frequency offset Removal: The measured samples at each receiver j are affected by a frequency offset $\delta f$ that differs across receivers and affects the phase as shown in Equation 4. We estimate the frequency offset by taking the time derivative of the received phase to obtain an estimate of the frequency and multiply by the negative exponential of this frequency to correct the frequency offset. i.e $x_j = 2\pi \delta f = \nabla(\arg(s_j))$. This step leverages observation 3 4.2, which enables us to extract only the frequency offset in this stage (as otherwise the time variation of $\phi_{ij}$ would also remain coupled with $\delta f$). Multiplying $s_j(m)$ with the negative of the estimated frequency offset yields the quantity $v_j(p,n)$ for each packet p and symbol n in the packet, where $v_j(p,n) = s_j(n) \cdot e^{-jx_j n}$.

3—Differential phase estimation: In this step, the frequency corrected samples of user 1 ($v_1(p,n)$) and user j ($v_j(p,n)$), j>1 are added sample by sample since we are interested in the differential phase across users for a given channel realization. Defining $z_j = \text{MEAN}(|v_j(p,m)|)$ and $z_t = \text{MEAN}(|v_j(p,m) + v_1(p,m)|)$, $$z_j(p) = c_1 |h_{1j}| \tag{9}$$

$$z_t(p) = c_1 (|h_{1j} e^{-j(\phi_{1j} + \theta_1)} + h_{11} e^{-j(\phi_{11} + \theta_2)}|) \tag{10}$$

Defining the phase difference between $h_{1j}$ and $h_{11}$ as $\omega(p)$, $\omega(p) = \phi_{1j} - \phi_{11} + \theta_2 - \theta_1$. On simplifying further, $$z_t(p) = c_1 \sqrt{|h_{1j}|^2 + |h_{11}|^2 + 2|h_{11}||h_{1j}|\cos(\omega(p))} \tag{11}$$

Combining equation 9 and 11, solving for $\omega(p)$ $$\omega(p) = \cos^{-1} \frac{2z_t(p)^2 - z_1(p)^2 - z_j(p)^2}{2z_1(p)z_j(p)} \tag{12}$$

On taking the average over several packets, the oscillator phase difference $\theta_2 - \theta_1$ which has a mean value of 0, is removed leaving the desired phase difference, namely $\Omega = \text{MEAN}(\omega(p)) = \phi_{1j} - \phi_{11}$. In this manner, the differential phase between $h_{1j}$ and $h_{11}$ is determined for all j users. The four way ambiguity in $\Omega$ is resolved similar to the single user case. The operations must be performed in the order indicated as otherwise the coupling among the phase components in Equation 4 cannot be resolved.

Referring now to FIG. 6, in block 601, based on the estimated channel in block 100, the weight vectors are obtained as the solution to the optimization problem $$\max \lambda$$
$$s.t. \|h_k^T w\|^2 = \lambda^2 P_i, k = 1, \ldots, K$$
$$\|w\|^2 = 1$$

which can be rewritten as follows $$Hw = \begin{bmatrix} h_1^T \\ \vdots \\ h_M^T \end{bmatrix} w = \lambda \begin{bmatrix} \sqrt{P_1} e^{j\phi_1} \\ \vdots \\ \sqrt{P_M} e^{j\phi_M} \end{bmatrix} = \lambda p$$

Next, in block 602, a particular solution can be obtained as $w_0 = \lambda H^+ p$ where $H^+$ is the pseudo-inverse of the matrix H. The solution is a function of $\phi_k$. An exemplary solution is obtained where all $\phi_k$ are set to zero.

In block 603, the optimal weight vectors may also be obtained as a solution to the following optimization problem $$\max \sum_{k=1}^{K} \eta_k \|h_k^T w\|^2$$
$$\|w\|^2 = 1$$

for a given set of $\eta_k$ where $$\sum_{k=1}^{K} \eta_k = 1.$$

The optimal weight vector solution is the eigenvector corresponding to the largest eigenvalue of the matrix $$\sum_{k=1}^{K} \eta_k h_k h_k^H.$$

Multi-user (MU) beamforming helps create a virtual MIMO set-up between the AP and multiple clients, allowing the aggregate rate to scale significantly better than when all dof are utilized for SU beamforming. The benefits of MU beamforming are higher at lower transmit power (10 dBm), where significant gains of about 8 dB are achieved over SU beamforming. However, the gain decreases to 4 dB at higher transmit power (18 dBm). This is because, while at lower transmit powers the RSSI at the non-beamformed client is significantly low in the SU strategies, it improves with increasing transmit power. This in turn reduces the variation in RSSI between the beamformed and non-beamformed clients in SU strategies and consequently the room for gains for MU strategy.

When a new client is added to the set, depending on the correlation between the channel of the new client and those of the existing clients, the RSSI achieved at the existing clients will have to accordingly decrease to accommodate the new client. In SU beamforming, the pattern is optimized to the channel of a single client. Hence, when a new client is added with a potentially different (uncorrelated) channel, the joint pattern could be significantly different from the individual optimized patterns. However, as more clients are added, the amount of adjustments needed to accommodate the new client to the existing joint pattern decreases, thereby also decreasing the degradation in RSSI. When more elements are available at the AP, the additional dof helps keep the joint pattern closer to the individual optimal patterns, thereby keeping the RSSI degradation lower.

The interference suppression capability of MU beamforming has also been tested. The objective for interference suppression is different from joint beamforming: increase the RSSI at the desired client, while reducing the interference (RSSI) received at the other clients. Unlike in joint beamforming, where clients with correlated channels are desired, for interference suppression the contrary is desired. If the undesired clients have channels that are less correlated with the desired client, then it is easier to suppress interference to the undesired clients without suffering any appreciable RSSI degradation for the desired client. Simulations show that: (i) MU beamforming provides good interference suppression with a large RSSI separation between the desired and undesired clients. A separation of 12 dB and 22 db for the three and eight element cases respectively, are achieved. The larger dof in the eight element case helps isolate the desired channel from the interference channels much better; (ii) With increasing number of interferers, there is a degradation in the RSSI of the desired client in order to accommodate the interfering clients. However, given the large number of dof in the eight element case, the degradation in RSSI of the desired client is only 1 dB while suppressing two interfering clients. The degradation (3 dB) is larger in the three element case but still acceptable for an achieved separation of 12 dB.

One of the key components that is closely coupled with MU beamforming is user selection (scheduling). When there are a large number of clients associated with an AP, the gains from MU beamforming depend on the subset of clients chosen and jointly beamformed to. Sufficient variation in RSSI exists depending on the pair chosen, which when translated to rate adaptation at low SNR would bring large throughput differences; and (ii) the variation is large, 5 dB for the eight element case and a lesser value of 2-3 dB for the three element case. This is because when the number of clients chosen is comparable to the number of dof (three elements), choosing the right set of clients (user diversity) is more important. However, when the number of dof is larger (eight elements) than the number of clients chosen, there is sufficient diversity on the transmit side that in turn diminishes the importance of user selection diversity. Given the practical scenario where the number of elements at AP is smaller than the number of associated clients, this motivates the need for joint scheduling and beamforming.

From the RSSI result, it can be seen that the scalability for MU beamforming is slower than that for SU beamforming. This is because the additional elements (dof) now have to improve the RSSI of both the clients through joint beamforming. Hence, the larger the channel variation across the two users, the lesser the scalability gains with increasing elements. However, since the RSSI of both the users is improved unlike in SU beamforming, the aggregate PDR gains are much better for MU beamforming as shown in FIG. 6(b). Since SU beamforming is optimized only for one of the clients, increasing the number of elements does not help increase the aggregate PDR beyond one. However, since only two clients are involved, two dof are sufficient for MU beamforming to support them, resulting in an aggregate PDR of 1.7 for the two element case and achieving an aggregate PDR of two for additional elements.

To summarize, tests reveal the following inferences for MU beamforming:
1) MU beamforming is essential to efficiently utilize the available elements (dof) at the AP, especially with large number of elements. Three clients were supported by MU beamforming as opposed to one in SU beamforming. Further, the gains of MU over SU beamforming are higher at lower transmit power (12 dB) than at higher transmit power (4 dB).
2) The degradation in RSSI is maximum (3-5 dB) when we go from SU to two user beamforming, but then begins to saturate (1 dB) with additional clients. Further, the degradation is more (6 dB) at smaller number of elements than at higher number of elements (4 dB).
3) The larger the dof (eight), the better is the isolation (22 dB) between the desired and interference channels; and lower is the degradation in RSSI (1 dB) for the desired client.
4) There is a tight coupling between user scheduling and beamforming. Further, the gains from user scheduling is higher in practical scenarios where the number of elements at AP is smaller than the number of associated clients.
5) The scalability of RSSI per client with number of elements is lower for MU beamforming than for SU beamforming. However, due to efficient dof usage, the aggregate PDR delivered is much better in MU beamforming.

The inventors also contemplate that rate adaptation can be done. With anticipated improvements in hardware capability, larger gains in the actual data rate can be achieved using a rate adaptation algorithm. Multiple simultaneous data streams can be supported—the estimation scheme can then be used with a different beamforming procedure to transmit multiple independent packets simultaneously. Feedback Overhead can be provided through the wireless channel and may cause additional overhead. Moreover, multiple distinct APs can perform joint beamforming to improve spatial reuse but factors such as synchronizing the transmissions of multiple APs, obtaining channel state information of all users and joint weight adaptation need to be addressed.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for transmitting signals between a transmitter and a receiver, comprising:
    differentially estimating channel coefficients for each one of antenna elements relative to a reference antenna element;
    determining beamforming weights to remove oscillator induced phase or offset; and
    applying a corrective beamforming solution at the transmitter to make a phase of a received signal from different ones of the antenna elements to be coherently combined at the receiver;
wherein said beamforming is for one of single users and multiple users.

2. The method of claim 1, comprising performing a coarse estimating of the channel coefficients.

3. The method of claim 2, comprising:
    a. measuring each pair of the antenna elements, $y_1$, $y_2$, $y_3$ using excitation (1,0) (0,1) and (1,1);
    b. averaging signal magnitudes across all symbols in a packet of signals between the transmitter and receiver and the determining the median as $y_1$, $y_2$ and $y_{12}$; and
    c. determining $\Omega_i = \cos^{-1}((y_{12}^2 - y_1^2 - y_2^2)/(2*y_1*y_2))$;
where yi is an average received signal amplitude at the receiver when element i alone is used at the transmitter, yjk is the received amplitude when both elements j and k are excited simultaneously at the transmitter at the same phase and $\Omega_i$ is a measured angle for ith antenna element with I being greater than 0.

4. The method of claim 3, comprising:
    a. exciting elements in the pairs of the antenna elements identified before using the determined $\Omega_i$ and its signed compliment ($\Omega_i$, $-\Omega_i$, $\pi-\Omega_i$, $-(\pi-\Omega_i)$; and
    b. determining an angle $\phi_i$ yielding the maximum signal strength at the receiver with $\phi_i$ being a correct phase applied to an ith antenna element.

5. The method of claim 4, comprising selecting an angle which has a higher packet delivery for angles with similar signal strength.

6. The method of claim 4, wherein the step of determining beam weights comprises:
    setting amplitudes $A_i = (y_i^2 / \Sigma y_i^2)$; and
    applying a negative of $-\phi_i$ to each element i.

7. The method of claim 1, comprising resolving ambiguities in the channel coefficient estimation.

8. The method of claim 1, comprising:
    a. performing differential channel estimation for a single user;
    b. removing data modulation induced phase;
    c. identifying a frequency offset by differentiating the phase of received radio signal samples; and
    d. determining offset angles between receivers.

9. The method of claim 8, comprising determining beamforming weights for multiple users.

10. The method of claim 8, comprising obtaining weight vectors by solving an optimization problem.

11. The method of claim 8, wherein the step of determining beamforming weights Hw for multiple users comprises solving $$Hw = \begin{bmatrix} h_1^T \\ \vdots \\ h_M^T \end{bmatrix} w = \lambda \begin{bmatrix} \sqrt{P_1} e^{j\phi_1} \\ \vdots \\ \sqrt{P_M} e^{j\phi_M} \end{bmatrix} = \lambda p$$

where $h_1^T \ldots h_K^T$ is a column vector that denotes a channel, K denotes users, $P_1:P_2: \ldots :P_K$, represents a given distribution, j denotes receivers, and w denotes a weight vector.

12. The method of claim 8, wherein the step of determining beamforming weights for multiple users comprises solving an optimal weight vector according to the relationship $$\max \sum_{k=1}^{K} \eta_k \|h_k^T w\|^2$$

$$\|w\|^2 = 1$$

for a given set of $\eta_k$ where $$\sum_{k=1}^{K} \eta_k = 1,$$

where $h_1^T \ldots h_K^T$ is a column vector that denotes a channel, K denotes users, and w denotes a weight vector.

13. The method of claim 12, wherein a solution to said optimal weight vector comprises determining an eigenvector corresponding to the largest eigenvalue of the matrix $$\sum_{k=1}^{K} \eta_k h_k h_k^H$$

* * * * *